(12) United States Patent
Roberts et al.

(10) Patent No.: US 8,635,598 B2
(45) Date of Patent: Jan. 21, 2014

(54) AUTOMATIC CODE DECORATION FOR CODE REVIEW

(75) Inventors: Clark H. Roberts, Seattle, WA (US); Michael A. Cook, Seattle, WA (US); Victor W. H. Boctor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 13/164,538

(22) Filed: Jun. 20, 2011

(65) Prior Publication Data

US 2012/0324425 A1 Dec. 20, 2012

(51) Int. Cl.
*G06F 9/44* (2006.01)

(52) U.S. Cl.
USPC .............................. 717/122; 717/102; 717/125

(58) Field of Classification Search
None
See application file for complete search history.

(56) References Cited

U.S. PATENT DOCUMENTS

| | | | | |
|---|---|---|---|---|
| 7,114,149 | B2 * | 9/2006 | Aptus et al. | 717/122 |
| 7,194,679 | B1 | 3/2007 | Green | |
| 7,500,224 | B2 * | 3/2009 | Hejlsberg et al. | 717/122 |
| 7,614,040 | B2 * | 11/2009 | Wagner et al. | 717/122 |
| 7,721,253 | B2 * | 5/2010 | Tatsumi et al. | 717/122 |
| 7,904,802 | B1 | 3/2011 | Kolawa et al. | |
| 8,099,673 | B2 * | 1/2012 | Parkinson | 717/125 |
| 8,250,523 | B2 * | 8/2012 | Hall et al. | 717/122 |
| 8,276,123 | B1 * | 9/2012 | Deng et al. | 717/125 |
| 8,495,567 | B2 * | 7/2013 | Bak et al. | 717/122 |
| 2003/0131313 | A1 | 7/2003 | Flanagan | |
| 2003/0149961 | A1 * | 8/2003 | Kawai et al. | 717/125 |
| 2005/0114841 | A1 | 5/2005 | Moskowitz et al. | |
| 2006/0294502 | A1 * | 12/2006 | Das et al. | 717/129 |
| 2007/0250810 | A1 | 10/2007 | Tittizer et al. | |
| 2008/0228762 | A1 * | 9/2008 | Tittizer et al. | 707/5 |
| 2008/0244418 | A1 * | 10/2008 | Manolescu et al. | 715/753 |
| 2008/0263520 | A1 * | 10/2008 | Aguilar et al. | 717/125 |
| 2008/0295085 | A1 | 11/2008 | Rachamadugu et al. | |
| 2009/0119576 | A1 * | 5/2009 | Pepper et al. | 715/230 |
| 2009/0138843 | A1 * | 5/2009 | Hinton et al. | 717/101 |
| 2009/0199079 | A1 * | 8/2009 | Pratley | 715/205 |
| 2009/0210860 | A1 | 8/2009 | Sutherland et al. | |
| 2009/0249299 | A1 | 10/2009 | Farchi et al. | |
| 2009/0271768 | A1 | 10/2009 | Goodson | |
| 2010/0162209 | A1 * | 6/2010 | Brown et al. | 717/110 |
| 2010/0325260 | A1 * | 12/2010 | Halla-Aho et al. | 709/224 |

(Continued)

FOREIGN PATENT DOCUMENTS

EP 1585026 10/2005

OTHER PUBLICATIONS

Jelinek et al., "GUI Generation from Annotated Source Code", 2004 ACM, pp. 129-136; <http://dl.acm.org/citation.cfm?doid=1045446.1045470>.*

(Continued)

*Primary Examiner* — Thuy Dao
*Assistant Examiner* — Ben C Wang
(74) *Attorney, Agent, or Firm* — Workman Nydegger

(57) ABSTRACT

The automated generation of code decoration for a body of code under review. Upon accessing the body of code, the system evaluates portions of the code for context. For at least some of those portions of code, the system identifies a decoration corresponding to that context, and adds the identified decoration to the body of code in a manner that the decoration is visually associated with the corresponding portion of the code.

19 Claims, 4 Drawing Sheets

(56) References Cited

U.S. PATENT DOCUMENTS

| | | | | |
|---|---|---|---|---|
| 2011/0023007 | A1* | 1/2011 | Chumbley et al. | 717/102 |
| 2011/0283252 | A1* | 11/2011 | Chen et al. | 717/102 |
| 2011/0283270 | A1* | 11/2011 | Gass et al. | 717/168 |
| 2012/0297363 | A1* | 11/2012 | Perisic et al. | 717/122 |
| 2012/0324419 | A1* | 12/2012 | Roberts et al. | 717/102 |
| 2013/0074038 | A1* | 3/2013 | Fox et al. | 717/122 |
| 2013/0124978 | A1* | 5/2013 | Horns et al. | 715/243 |

OTHER PUBLICATIONS

Pearson et al., "Intuitive Source Code Visualization Tools for Improving Student Comprehension: BRICS", 2008 Cornell University, pp. 1-7; <http://arxiv.org/abs/0803.0515>.*

Renaud Pawlak, "Spoon: Compile-Time Annotation Processing for Middleware", 2006 IEEE, pp. 1-13; <http://ieeexplore.ieee.org/stamp/stamp.jsp?tp=&arnumber=4039271>.*

Cruciable—Retrieved Date: Feb. 25, 2011, (2 pages) http://www.atlassian.com/software/crucible/tour/.

Hammurapi—Retrieved Date: Feb. 25, 2011, (2 pages) http://www.hammurapi.com/dokuwiki/doku.php/products:hammurapi:start.

An Open Source App: Rietveld Code Review Tool—Retrieved Date: Feb. 25, 2011, (2 pages) http://code.google.com/appengine/articles/rietveld.html.

Collaborative Code Review Tool 1.2.1—Retrieved Date: Feb. 25, 2011, (2 pages) http://marketplace.eclipse.org/content/collaborative-code-review-tool.

EtherCodes: Collaborative Code Review & Editing Tool—Retrieved Date: Feb. 25, 2011, (9 pages) http://www.makeuseof.com/dir/ethercodes-collaborative-code-review/.

Google Mondrian: web-based code review and storage—Retrieved Date: Feb. 25, 2011, (7 pages) http://www.niallkennedy.com/blog/2006/11/google-mondrian.html.

Open source tools like Review Board—Retrieved Date: Feb. 25, 2011; (1 page) http://code.google.com/p/reviewboard/z.

SeeCode—A Code Review Plug-in for Eclipse—Published Date: 2008, (15 pages) http://www.research.ibm.com/haifa/conferences/hvc2008/present/ShochatRazFarchi__25.pdf.

Code Collaborator—Retrieved Date: Mar. 30,2011, (20 pages) http://smartbear.com/resources/cc/book/code-collaborator.pdf.

* cited by examiner

| Code | | + - □ × | | Viewing Iteration I | 400 | | - □ × |
|---|---|---|---|---|---|---|---|
| File | Change | | File B6 | | | | |
| ⌐ DirA | 402 | | | 906 | public Icollection<CodeReviewSummary> GetActiveReviewsForReviewer(string reviewerLogin) | 401 | |
| • FileA1 | Edit | | | 907 | { | | |
| ⌐ DirB | | | | 908 | try | | |
| • FileB1 | Add | | | 909 | { | | |
| • FileB2 | Edit | | | ⌐ 417 | if (String.IsNullOrWhiteSpace(reviewerLogin)) | | |
| • FileB3 | Edit | | | ⌐ 418 | throw new ArgumentNullException("reviewerLogin"); | | |
| • FileB4 | Add | 421 | | 910 | } | | |
| • FileB5 | Edit | | | 911 | Log.TraceInfo("ReviewService.GetActiveReviewsForReviewer(reviewerLogin={0}", reviewerLogin); | | |
| • FileB6 | Edit | | | 912 | return ServiceStorage.Instance.QueryActiveCodeReviewsForReviewer(reviewerLogin); | | |
| • FileB7 | Edit | | | 913 | return this.DashboardQueryAdapter.GetActiveReviewsForReviewer(reviewerLogin); | | |
| • FileB8 | Edit | | | 914 | } | | |
| • FileB9 | Edit | | | 915 | catch (Exception ex) | | |
| ⌐ DirC | | | | 916 | { | | |
| • FileC1 | Edit | | | 917 | throw HandleOuterException(ex); | | |
| ⌐ DirD | | | | 918 | } | | |
| • FileD1 | Delete | | | 919 | } | | |
| • FileD2 | Edit | | | 920 | /// <summary> | | |
| • FileD3 | Edit | | | 921 | public Icollection<CodeReviewSummary> GetActiveReviewsForProject(string projectShortName) | | |
| • FileD4 | Edit | | | 922 | { | | |
| • FileD5 | Edit | | | 923 | try | | |
| ⌐ DirE | | | | 924 | { | | |
| • FileE1 | Edit | | | 925 | Project.EnsureValidShortName(projectShortName); | | |
| • FileE2 | Edit | | | 926 | Log.TraceInfo("ReviewService.GetActiveReviewsForProject(project={0}", projectShortName); | | |
| ⌐ DirF | | | | 927 | return ServiceStorage.Instance.QueryActiveCodeReviewsForProject(projectShortName); | | |
| • FileF1 | Edit | | | 928 | return this.DashboardQueryAdapter.GetActiveReviewsForProject(projectShortName); | 415 | |
| Reviewer Status | 403 | | | 929 | catch (Exception ex) | | |
| John Doe 1 | | | | | { | | |
| John Doe 2 | | | 100% ▼ ◄ | | | | ► |
| | | | Status | File Name | 416 | Reviewer  Line  Last Updated  Thread length | |
| Complete Review | Recall | | | | | 404 | |
| 431 | 432 | 433 | | | | | *Figure 4* |

Figure 5

AUTOMATIC CODE DECORATION FOR CODE REVIEW

BACKGROUND

Computer systems and services have revolutionized the way people live, work, and do business. The operation of such systems and services are directed, in large part, by computer software. Computer software is often generated by computer programmers drafting source code (i.e., a computer program). That source code is ultimately compiled or interpreted into machine readable code prior to and/or at execution time.

As the functionality of such computing systems and services has increased, computer programs have become ever more complex. Many computer programs are too complex to be authored by any one person. Accordingly, computer programs are often collaboratively authored by a team of computer programmers. In order to facilitate collaborative authoring of computer programs, a variety of helpful conventional collaborative authoring programs exist. Such tools often permit the team to move from one version of the code to the next.

In addition to being more complex to author, the software should be carefully reviewed for each version of the code. Accordingly, collaborative review programs also exist. Thus, while collaborative authoring programs permit changes to be made in order to move from one version of the code to the next, collaborative review programs enable detailed review of each version of the code so as to understand and plan the changes that should be made in the next phase of authoring.

BRIEF SUMMARY

At least one embodiment described herein relates to the automated generation of code decorations for a body of code under review. Upon accessing the body of code, the system evaluates portions of the code for context. For at least some of those portions of code, the system identifies a decoration corresponding to that context, and adds the identified decoration to the body of code in a manner that the decoration is visually associated with the corresponding portion of the code.

The decorations could be anything that extends beyond the body of code. For example, the decorations could be any visualized item that helps in the review of the underlying body of code. As examples only, the decorations could be review tips, automated comments, complexity indicators, bug links, iterative revision marking, news feeds, visualized layering, and so forth. The decorations might actually include additional visual layers above the body of code to indicate anything helpful for review, such as which portion of the code has been tested, and which has not, and so forth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4 illustrates an example user interface that shows a differential view in which revision changes are shown as code decorations; and FIG. 5 illustrates an example user interface that is similar to the user interface of FIG. 4, except that now discussion thread decorations adorn the code.

DETAILED DESCRIPTION

In accordance with embodiments described herein, the automated generation of code decorations for a body of code under review is described. Upon accessing the body of code, the system evaluates portions of the code for context. For at least some of those portions of code, the system identifies a decoration corresponding to that context, and adds the identified decoration to the body of code in a manner that the decoration is visually associated with the corresponding portion of the code. First, some introductory discussion regarding computing systems will be described with respect to FIG. 1. Then, the embodiments of the automated decoration process will be described with respect to FIGS. 2 through 5.

Figure 1:
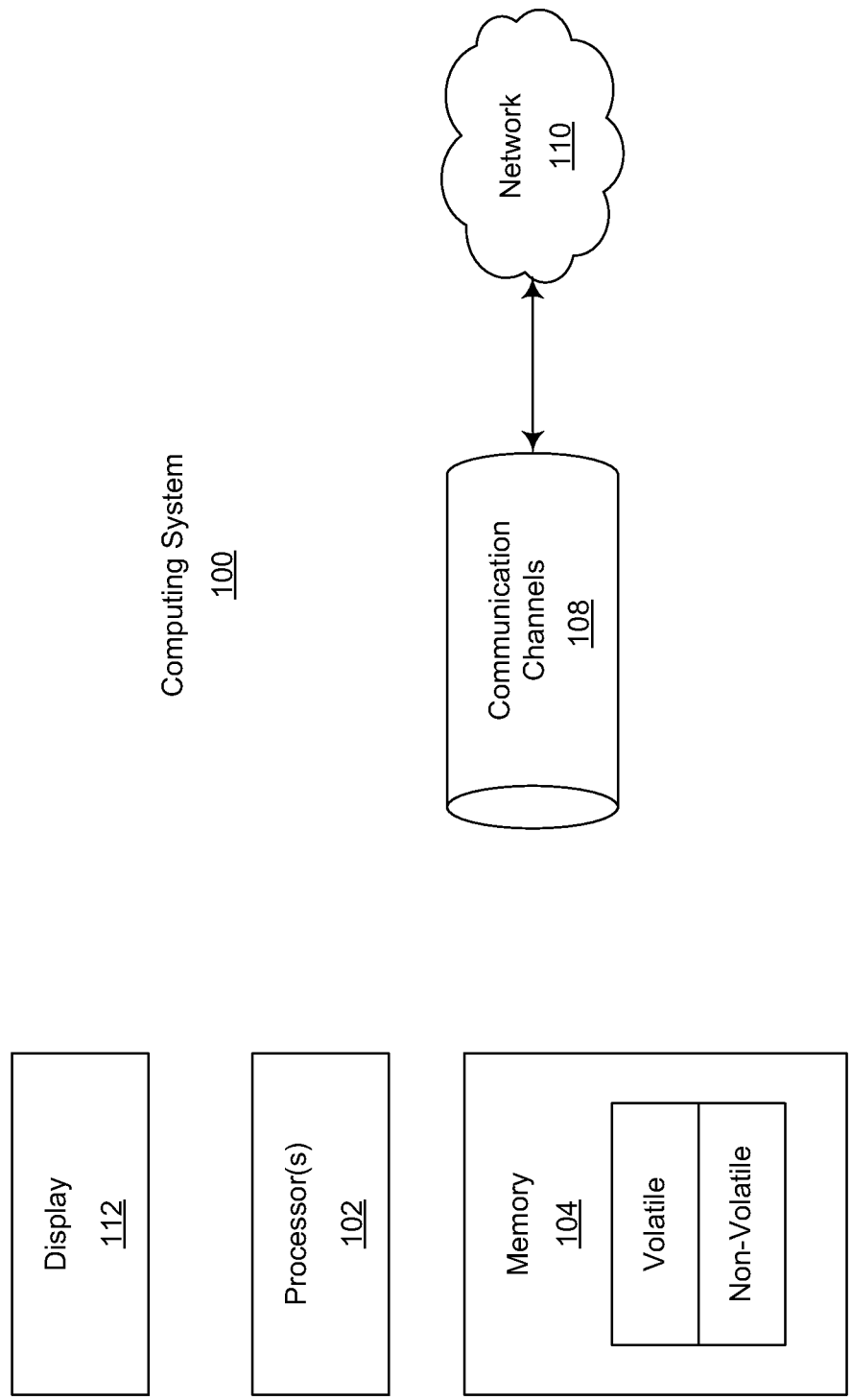
FIG. 1 illustrates an example computing system that may be used to employ embodiments described herein.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
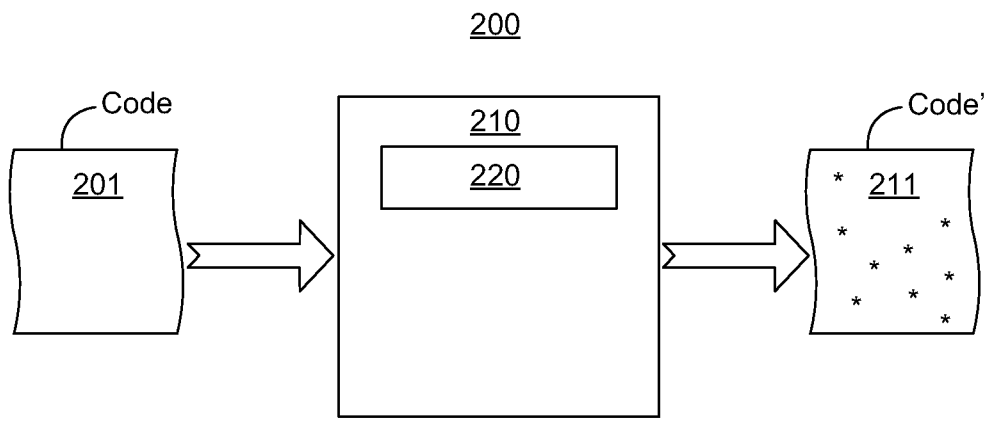
FIG. 2 schematically illustrates code that is undergoing an automated code decoration process.

FIG. 2 schematically illustrates an environment 200 that illustrates code undergoing an automated code decoration process. The code 201 is accessed by a review computing system 210, which may be structured as described above for the computing system 100 of FIG. 1. The review computing system 210 may be the same computing system on which one of the reviewers performs review of the code, although that need not be the case. The review computing system 210 decorates the code to thereby generate decorated code 211.

In one embodiment, the review computing system 210 includes a computer program product 220 that comprises one or more computer readable media (such as computer storage media) having thereon computer-executable instructions that are structured such that, when executed by one or more processors of a computing system, cause the computing system to perform the decoration process. For instance, the review computing system may perform the method 300 of FIG. 3, which illustrates a method 300 for automatically generating code decorations for a body of code. The method 300 of FIG. 3 will now be described with frequent reference to FIG. 2. Following the descriptions of FIGS. 2 and 3, specific user interface examples of decorated code will be described with respect to FIGS. 4 and 5.

Figure 3:
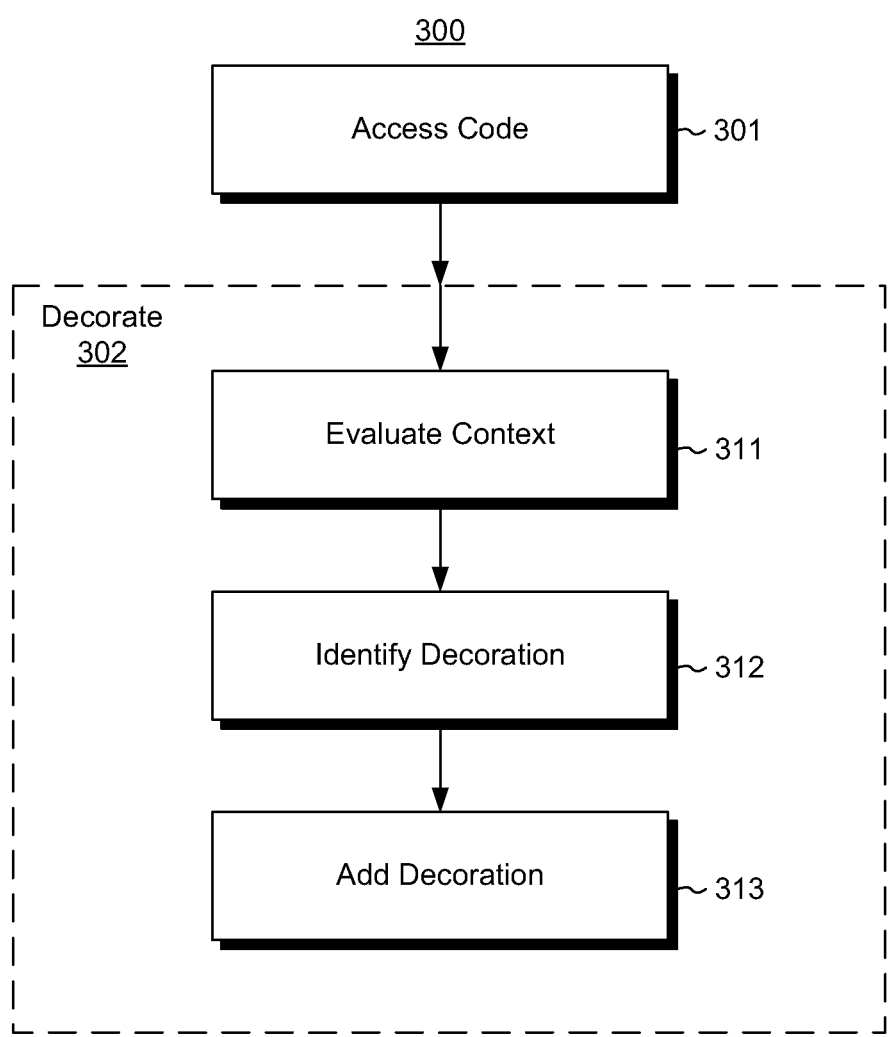
FIG. 3 illustrates a flowchart of a method for automatically decorating code in accordance with the principles described herein.

Referring to FIG. 3, the method 300 includes an act of accessing a body of code (act 301). In FIG. 2, for example, the review computing system 210 accesses the code 201. The code 201 may be, for example, all or a portion of a computer program and may, for example, be source code, or perhaps some form of intermediate code that is more interpretable to a human reader than strict binary code.

The review computing system then decorates (act 302) at least one portion of the code. For instance, in FIG. 2, the review computing system 210 generates decorated code 211, where the decorations are symbolically represented using asterisks. In FIG. 2, the decorated code 211 is illustrated as including a number of asterisks, although there is no limit to the type or number of decorations that may be added by the review computing system.

In this description and in the claims, a "decoration" is a data structure that when rendered, results in a visualization being displayed. In this description and in the claims, a decoration is "added" to code when the data structure is associated with a portion of a code such that when the portion of code is rendered on a display (such as display 112 of FIG. 1), the decoration is visually correlated with the portion of the code. In this description and in the claims, "decorating" code refers to an act of adding one or more decorations to the code, perhaps at different locations of the code.

In one embodiment, the "decorated code" is the combination of the original code, the decoration data structures, and the association between each decoration data structure and a corresponding portion of code. However, in other embodiments, one or more, or perhaps even all, of the decoration data structure and/or the corresponding association with portions of the code may be represented by altering the code itself in a manner that does not affect the binary (e.g., using the commenting system of the language in which the code is written). Potentially, the decoration conveys human-interpretable information regarding the portion of the code and/or is not structured to affect the functionality of the binary during execution. As an example, the undecorated code may be provided to a compiler/interpreter, or even if the decorations are within the code, the compiler/interpreter may be configured to ignore such decorations just as it ignores comments embedded in the code using the commenting system.

For instance, the original author of the code can embed decorations into the comments which are then detected by the review computing system 210. The original author of the code does not have to be the same as the one posting changes for review. Alternatively or in addition to adding decorations to the code review, the code may be transformed into a format that is easier to review. For instance, although not required, the transformed format may be consumable by the corresponding interpreter or compiler. The transformation may allow for greater ease of review. A simple example of this is ignoring white spaces when doing a differential view between two versions of the code. A more complex one is reformatting an XML file to a standard format with a standard indentation so that new lines, spaces, style (e.g. <br /> vs <br>) don't affect the review. The goal here would be to focus on logical changes. In some embodiments, the reviewer is able to turn off/on such transformations/decorations.

The acts 311 through 313 included within the act of decorating 302 may be performed for each added decoration. Specifically, the review computing system evaluates a context (act 311) of a portion of the code. While not all portions of the code will have a context that suggests that a decoration should be included, the review computing system will identify at least one portion of the code that should be decorated. As one example, the portion of the code may include a word, a line of code, a range of lines of code, a method, a function, a component, or any other component of the code. The portion may include multiple portions of the code, which may, or may not, be contiguous.

The review computing system then identifies or calculates a decoration (act 312) corresponding to the context of the portion of code. In some cases, the identification may be quite straightforward, but in other cases, the identification may involve more complex calculations. Examples of decorated portions of code will be described with respect to several user interfaces in FIGS. 4 and 5. That said, the variety of decorations may vary as the principles described herein are not limited to any particular type of decoration.

The decoration is then added to the body of code (act 313) in a manner that corresponds to the portion of the code. For instance, the adding of the decoration may be performed by associating the decoration with the corresponding portion of the code, such that when the body of code is rendered on a display, there is a visualization of the correspondence on the display.

Figure 5:
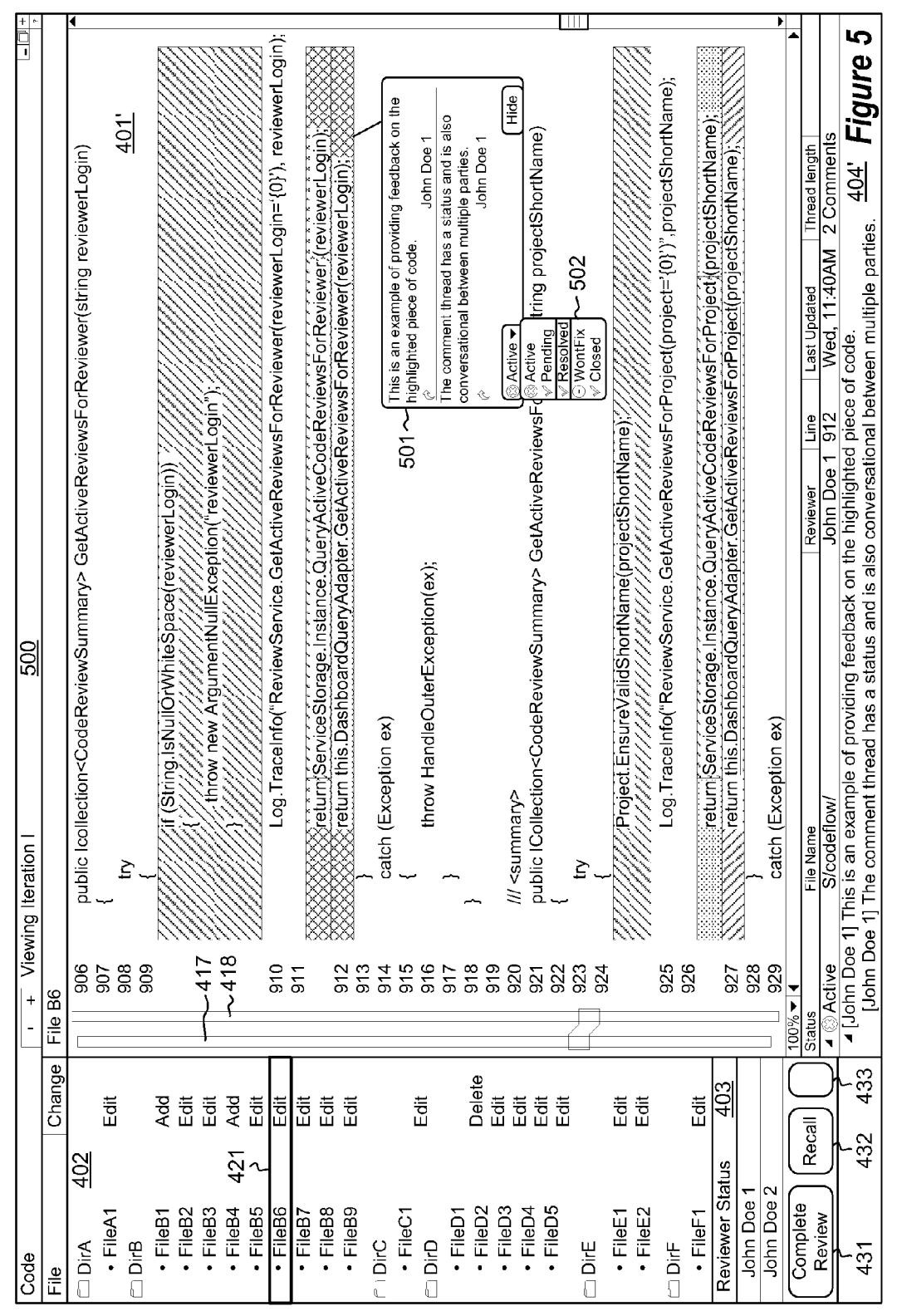

FIGS. 4 and 5 illustrate example user interfaces for purposes of illustrating only two examples of code decorations. However, the principles described herein broadly apply to any type of automated code decoration. Understanding that these are just examples, FIGS. 4 and 5 will now be described in further detail.

FIG. 4 illustrates a differential view user interface 400 that includes a code view area 401, a file selection area 402, a reviewer status area 403, and a comment view area 404. The file selection area 402 lists several code files that could be reviewed, with file 421 being selected. The selected code file 421 is displayed in the code view area 401. Since the code under review is much larger than can be displayed in the code view area (as would most often be the case), the code view area 401 has several navigation aids. For instance, the code view area 401 has a vertical scroll bar 415 and a horizontal scroll bar 416, which are activated to be in use whenever the vertical scope and horizontal scope, respectively, of the code exceed that illustrated in the code view area 401. The code view area 401 also has position reference indicators 417 and 418 that represent the current vertical position of the viewable code within the entire scope of the code.

The code view area 401 of the differential view user interface shows a differential view comparing multiple versions of the code. This allows the reviewer to quickly ascertain the differences between different versions of the code, so that they can focus more deeply on specific changes made between versions. The principles described herein are not limited to the manner of visualization or the actual visualization itself of the differences between versions of the code. However, the use of color is one of an infinite variety of ways in which differentiation could be visualized.

However, the use of color is avoided in this patent application. Instead, areas marked with rightward facing hashed boxes are used instead of red highlighting in FIG. 4 (but such areas will be still be referred to herein as being "red-highlighted" with reference to FIG. 4). Furthermore, areas marked with leftward facing hashed boxes are used instead of yellow highlighting in FIG. 4 (but such areas will still be referred to as being "yellow-highlighted" with reference to FIG. 4). Areas marked with underlining in FIG. 4 are used instead of green highlighting in FIG. 4 (but such areas will still be referred to as being "green-highlighted" with reference to FIG. 4). Areas marked with dots are used instead of pink highlighting in FIG. 4 ((but such areas will still be referred to as being "pink-highlighted" with reference to FIG. 4).

Referring to FIG. 4, the code view area compares two versions of the code called herein a current version, and a reference version. Lines that are entirely highlighted in red (with rightward facing hash marking in FIG. 4) are lines that have been entirely added in the current version compared to the reference version. Lines that have both red portions (right hashing) and pink portions (dotted in FIG. 4) are lines in which there have been additions made, but in which the red portions (right hashing) are the specific portions added. Lines that are entirely highlighted in green (underlining in FIG. 4) are lines that have been entirely deleted in the current version compared to the reference version, although there are no examples of such lines in FIG. 4. Lines that have both yellow portions (left hashing) and green portions (underlined) are lines in which there have been deletions made, but in which the yellow portions (left hashing) are the specific portions deleted. The position reference indicator 417 shows the relative position of the viewed code in the entire code with reference to the current version. The position reference indicator 418 shows the relative position of the viewed code in the entire code with reference to the reference version.

The differential view user interface 400 also illustrates a reviewer status area 403 and a comments area 404. The reviewer status area 403 allows a reviewer to select a control 431 to indicate that the reviewer has signed off on the current version of the code. The control 432 allows the reviewer to recall a prior sign-off on the code. The control 433 permits the reviewer to instant message with others on the review team.

The comments area 404 permits a different view on the comments that are displayed in the code view area 401. However, as there are no comments displayed in the code view area 401 in FIG. 4, there are likewise no comments displayed in the comments area 404 of FIG. 4.

Accordingly, FIG. 4 illustrates a differential view user interface 400 that includes revision marking or some other visualization that compares versions of the displayed code. Referring to FIG. 2, the code 201 provided to the reviewer computing system 210 may be the current version of the code, with the reviewer computing system 210 also having access to the reference version of the code. The computer program product 220 may have the logic necessary to determine the visualizations that should be applied to multiple portions of the code, and generate the decorated code 211 that, when visualized, illustrates the decorated code.

FIG. 5 illustrates a differential view user interface 500 that is similar to the user interface 400 of FIG. 4. In fact, the differential view user interface 500 may be the same user interface as that of FIG. 4, except that now comments have been added to the code and associated with a specific portion of the code (in this case, line 912 of the code). The comments decoration 501 includes a discussion thread that may include comments from multiple commenters. The comments decoration 501 also may include a visualization (in this case drop down box 502) that indicates a status of the thread. An active status indicates that the thread has been created by a reviewer, but the subject of the discussion thread has not yet been addressed by the author. A pending status indicates that the author agrees with the reviewer, but has not yet applied a fix. A resolved status indicates that the author has fixed the issue or answered the reviewer's question. A "wontfix" status indicates that the author does not agree with the suggestion of the discussion thread, and hence the author provided an explanation of their point of view and marked the thread as "won't fix". A closed status indicates that the author and reviewer confirm the fix.

The comments area 404' of FIG. 5 is slightly different as compared to the comments area 404 of FIG. 4 in its content. The comments area 404' now has a different view on all of the displayed comments in the code view area 401'.

FIGS. 4 and 5 are just a few examples of code decorations, and by no means, encompass even a small fraction of the possible code decorations that may be implemented using the principles described herein. To show the variety possible, a few more examples will now be described, but not necessarily illustrated. The specific examples provided herein (which are just a sampling only), include automated comments, review tips, bug tips, layering, complexity, document attachment, and so forth, which will all now be described in that order.

Automated comments decorations are decorations in which there are automatically comments made regarding a portion of the code. The reviewer computing system could calculate a comment and insert that comment into an existing discussion thread, or create a new discussion thread. Alternatively, the reviewer computing system might insert a comment into the code using the commenting system of the code. As a small example, the reviewer computing system may perform a static analysis of the code, and make comments where there are noteworthy issues. The reviewer computing system may also determine where there is not sufficient commenting in the code, and add some basic comments, such as an enumeration of the input and output parameters of a method, and the title of the method, and so forth. Note that the reviewer computing system will look at the code and add comments, but would not change the code.

Review tip decorations include review tips for a portion of the code. Again, static analysis may evaluate the context for that portion, and suggest some comment review tips (such as a review checklist) for that portion of code. The review checklist may have been generated by a human or computing system, and may correspond to reviewing items that have proven helpful in the past when encountering similar code. Alternatively or in addition, instead of being a decoration comment, the review tips might exist in a panel for example at the top of the view showing the author/reviewer tips about issues to look for when reviewing changes in the corresponding code.

A bug tip decoration corresponds to a portion of the code in which a "bug" (i.e., a coding error) has been found, and may provide a link and/or include further information regarding the bug and possible fixes. The reviewing computing system may have a compiler to identify the bugs, and may also have access to a bug library to provide such code decorations.

Layering decoration may overlay entire layers over the code. For instance, such layers may include partially translucent visualizations. As an example, the superimposed layer may be a translucent layer with a certain color filter that depends on some characteristics about the underlying code. For instance, the superimposed layer may include a tested indication layer that visually distinguishes code depending on whether or not the code has been tested. For instance, the superimposed layer may overlay test code coverage information that highlights the code that was executed by the test code.

A complexity decoration may include complexity information regarding a portion or all of the code.

A document attachment decoration may be an attached document decoration in which documents are attached to a code review. For example, when submitting a code review, the author may attach the design document. Another kind is where the results of the test run can be attached to the code review once the test run is complete. In some cases, the test run can take several hours and authors may elect to kick-off a code review, and once the test pass is completed, the results are attached to that already existing code review.

Accordingly, the code decoration process may include a wide variety of code decorations that supplement the code with information that would be helpful to a reviewer to evaluate and review the code. This potentially has the ability to significantly improve the efficiency and quality of the review, thereby potentially improving the quality of resulting code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of automatically generating code decorations that facilitate comparison of different versions for a body of code, the method comprising acts of:
   a review computing system accessing a body of code for which different versions of the code are to be reviewed and compared;
   generating a plurality of decorations each comprised of a data structure that when rendered results in a visual marking for a selected portion of code that is to be decorated for one of the different versions of the code, and the data structure for each decoration performing the following acts when rendered by a review computing system:

evaluating a context of the selected portion of code that is to be decorated;

identifying a particular decoration corresponding to that context; and adding the particular decoration to the selected portion of code in a manner that results in a visualization that identifies the selected portion of code based on the particular decoration added to the selected portion of code;

displaying on a user interface the selected portion of code to which the particular decoration has been added in a manner that permits comparison of the decorated selected portion of code for one of the different versions of code with another version of the code; and reference indicators that display indications of current vertical position of both the decorated selected portion of code for said one version of the code and a corresponding vertical position of the other version of code to which the decorated selected portion of code is being compared, the current vertical position of the indications indicating where the displayed code is generally located in relation to the entire code for each version being displayed; and prior to displaying the decorated selected portion of code for comparison with another version of the code, the review computing system transforming the code to be displayed into a format that facilitates easier review of the code.

2. The method in accordance with claim 1, wherein the particular decoration added to the selected portion of the code includes a review tip for the selected portion of the code.

3. The method in accordance with claim 1, wherein the particular decoration added to the selected portion of the code includes at least one visual layer superimposed over the selected portion of the code.

4. The method in accordance claim 3, wherein one of the at least one visual layer is a tested indication layer that visually distinguishes code depending on whether or not the selected portion of code has been tested.

5. The method in accordance with claim 3, wherein the particular decoration added to the selected portion of the code includes a plurality of visual layers superimposed over the selected portion of the code.

6. The method in accordance with claim 1, wherein the selected portion of the code includes only a subset of the body of code.

7. A computer program product comprising one or more computer storage memories having thereon computer-executable instructions that are structured such that, when executed by one or more processors of a computing system, cause the computing system to perform a method of automatically generating code decorations that facilitate comparison of different versions for a body of code, the method comprising acts of:

accessing a body of code for which different versions of the code are to be reviewed and compared;

generating a plurality of decorations each comprised of a data structure that when rendered results in a visual marking for a selected portion of code that is to be decorated for one of the different versions of the code, and the data structure for each decoration performing the following acts when rendered:

evaluating a context of the selected portion of code that is to be decorated;

identifying a particular decoration corresponding to that context; and adding the particular decoration to the selected portion of code in a manner that results in a visualization that identifies the selected portion of code based on the particular decoration added to the selected portion of code; and displaying on a user interface the selected portion of code to which the particular decoration has been added in a manner that permits comparison of the decorated selected portion of code for one of the different versions of code with another version of the code; and reference indicators that display indications of current vertical position of both the decorated selected portion of code for said one version of the code and a corresponding vertical position of the other version of code to which the decorated selected portion of code is being compared, the current vertical position of the indications indicating where the displayed code is generally located in relation to the entire code for each version being displayed.

8. The computer program product in accordance with claim 7, wherein the particular decoration added to the selected portion of the code includes a review tip for the selected portion of the code.

9. The computer program product in accordance with claim 7, wherein the particular decoration added to the selected portion of the code includes an automatic comment that is inserted into the selected portion of the code using a commenting system of the selected portion of the code.

10. The computer program product in accordance with claim 7, wherein the particular decoration added to the selected portion of the code includes a bug tip that includes further information regarding a bug within the selected portion of the code.

11. The computer program product in accordance with claim 7, wherein the particular decoration added to the selected portion of the code includes at least one visual layer superimposed over the selected portion of the code.

12. The computer program product in accordance with claim 7, wherein the particular decoration added to the selected portion of the code includes revision marking that is used to compare said one version of the selected portion of code to another version of the code for the selected portion.

13. The computer program product in accordance with claim 7, wherein the particular decoration added to the selected portion of the code includes complexity information regarding the selected portion of the code.

14. The computer program product in accordance with claim 7, wherein the selected portion of the code includes all of the code.

15. The computer program product in accordance with claim 7, wherein the selected portion of the code comprises a plurality of portions of the code for one of the versions.

16. The computer program product in accordance with claim 7, wherein the particular decoration conveys human-interpretable information regarding the selected portion of the code.

17. The computer program product in accordance with claim 7, wherein the particular decoration is human-interpretable, but does affect resultant binary when the selected portion of code is compiled.

18. A computer program product comprising one or more computer storage memories having thereon computer-executable instructions that are structured such that, when executed by one or more processors of a computing system, cause the computing system to perform a method of automatically generating code decorations that facilitate comparison of different versions for a body of code, the method comprising acts of:

accessing a body of code for which different versions of the code are to be reviewed and compared;

generating a plurality of decorations each comprised of a data structure that when rendered results in a visual marking for a selected portion of code that is to be decorated for one of the different versions of the code, and the data structure for each decoration performing the following acts when rendered:

evaluating a context of the selected portion of code that is to be decorated;

identifying a particular decoration corresponding to that context; and adding the particular decoration to the selected portion of code in a manner that results in a visualization that identifies the selected portion of code based on the particular decoration added to the selected portion of code; and simultaneously displaying on a user interface the selected portion of code to which the particular decoration has been added in a manner that permits comparison of the decorated selected portion of code for one of the different versions of code with another version of the code; and reference indicators that display indications of current vertical position of both the decorated selected portion of code for said one version of the code and a corresponding vertical position of the other version of code to which the decorated selected portion of code is being compared, the current vertical position of the indications indicating where the displayed code is generally located in relation to the entire code for each version being displayed; and prior to displaying the decorated selected portion of code for comparison with another version of the code, transforming the code to be displayed into a format that facilitates easier review of the code.

19. The computer program product in accordance claim 18, wherein the particular decoration added to the selected portion of code is a visual layer that is a tested indication layer that visually distinguishes code depending on whether or not the selected portion of code has been tested.

\* \* \* \* \*